United States Patent [19]

MacAlpine

[11] 3,747,955

[45] July 24, 1973

[54] TANDEM TRAILER FOR A BICYCLE

[76] Inventor: Alexander D. MacAlpine, 50 N. Main St., Natick, Mass. 01760

[22] Filed: Dec. 23, 1971

[21] Appl. No.: 211,456

[52] U.S. Cl. .............................. 280/204, 280/202
[51] Int. Cl. ............................................ B62k 27/12
[58] Field of Search .................... 280/204, 292, 495, 280/496, 202

[56] References Cited
UNITED STATES PATENTS

| 3,271,048 | 9/1966 | Beesley et al. | 280/204 |
| 2,343,019 | 2/1944 | Neal | 280/204 |
| 2,517,162 | 8/1950 | Arman | 280/204 |

FOREIGN PATENTS OR APPLICATIONS 635,027   3/1950   Great Britain

Primary Examiner—Kenneth H. Betts
Assistant Examiner—J. M. McCormack
Attorney—Robert T. Gammons et al.

[57] ABSTRACT

A tandem trailer designed to be detachably attached to a bicycle wherein the trailer comprises a frame provided with upper and lower horizontal frame members joined by a vertical frame member such that wheels mounted on the lower frame member support the upper frame member in a substantially horizontal position above the rear wheel of a bicycle so that the bicycle and frame are free to turn relative to each other, the upper frame member having a loop adapted to be placed about the seat ahead of the seat post, a fixed pivot pin mounted on the top bar of the bicycle frame forwardly of the seat post on which the loop is adapted to be pivotally impaled, and spring-biased clips adapted to releasably hold the loop on the pin.

9 Claims, 4 Drawing Figures

PATENTED JUL 24 1973　　　　　　　　　　　　　　　3,747,955

TANDEM TRAILER FOR A BICYCLE

BACKGROUND OF THE INVENTION

Seats and carrying frames adapted to be mounted on a bicycle frame for carrying infants, small children, bundles and the like are in common use; however, such devices are not especially satisfactory because when used for carrying a child the child is seated so close to the rear of the rider that he can see little more than the back of the rider. Tandem-like trailers are also used; however, these are permanently connected to the bicycle frame thus making the bicycle unwieldly and since it is permanently attached making it impossible to use the bicycle and trailer independently of each other. The purpose of this invention is to provide a tandem trailer for use in combination with a bicycle which will afford the advantage of placing the occupant well behind the back of the rider for maximum enjoyment of the ride while at the same time preserving the mobility of the bicycle and the independence of use of the bicycle and trailer. Other objects are to provide a sturdy, light-weight structure which adds very little drag to the rider, which is adapted to be quickly and easily attached and detached without need for tools or other implements, and which is of attractive appearance.

SUMMARY

As herein illustrated, the invention comprises the combination with a bicycle of a trailer comprising a chassis embodying upper and lower spaced parallel frame members joined by a vertical frame member, a pair of wheels journaled at the distal end of the lower frame member, a loop at the distal end of the higher frame member adapted to be placed over the seat of the bicycle about the seat supporting post, said wheels being adapted to support the trailer when the loop is disposed about the seat post with the upper horizontal frame member in a substantially horizontal position clearing the top of the rear wheel of the bicycle so that the bicycle and trailer can turn at any angle relative to each other without binding, and means for releasably pivotally connecting the loop to the top bar of the bicycle frame, comprising a pin projecting upwardly from the top bar forwardly of the seat post and beneath the seat, said loop containing a vertically disposed diametrical hole for pivotally receiving the pin, and spring clip means adapted to embrace and hold the loop on the pin when the loop is mounted thereon. A skirt is mounted on and covers that portion of the frame commencing on the lower frame member forwardly of the wheel and extending forwardly and upwardly over the vertical frame member and forwardly onto the upper frame member, and comprises a deflector and support for the feet of the occupant of the seat. A receptacle may be mounted behind the seat for carrying bundles, articles and the like, and there is a stand pivotally mounted on the lower horizontal frame member forwardly of the wheels for supporting the trailer when detached from the bicycle. The pin comprises a bolt inserted through the top bar from the underside and retained thereon by a nut screwed onto it from the upper side and the spring clamp means comprise opposed upright, spring-biased fingers having opposed bowed portions adapted to receive between them the loop at the forward end of the frame.

The invention will now be described in greater detail with reference to the accompanying drawings wherein.

Figure 1:
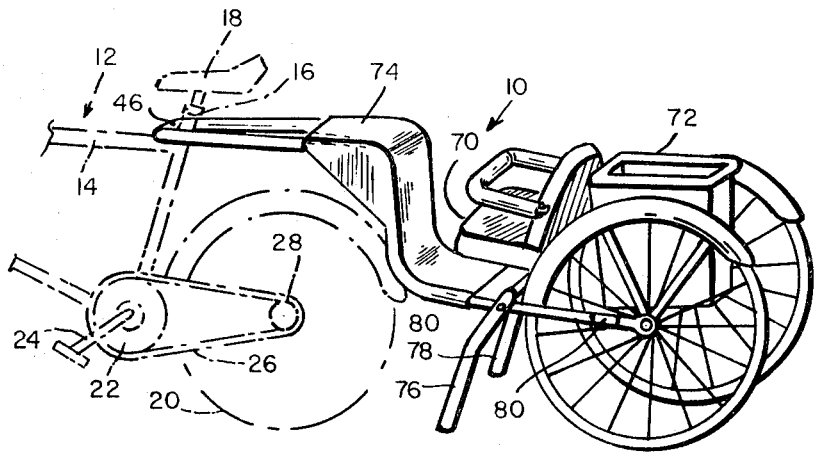
FIG. 1 is a side view, partly in perspective, of the tandem trailer connected to a bicycle, only the rear portion of which is shown.

Referring to the drawings, the tandem trailer 10 of this invention is shown as attached to a bicycle, only the rear portion of the latter being shown and in broken lines.

The bicycle frame 12 is of conventional construction, having an upper horizontal bar 14 from which rises a seat post 16 in which there is mounted a seat 18. The frame supports in conventional fashion the rear wheel 20 and driving means therefor comprising a drive sprocket 22, pedals 24, a chain 26 and a wheel sprocket 28.

The tandem trailer comprises a frame 30 having an upper horizontal frame portion 32, a lower horizontal frame portion 34 and a vertical frame portion 36 connecting the two, the three frame portions being integral or constructed separately and attached to each other as desired. The lower frame member is provided with a transverse brace 38, a transverse shaft 40 and spaced parallel, longitudinally extending braces 42—42 which form in conjunction with the lower frame member a rigid structure which is free from twisting or skewing when travelling over uneven surfaces. A pair of wheels 44—44 are journaled on the shaft 40 between the frame members 34—34 and the braces 42—42.

Figure 3:
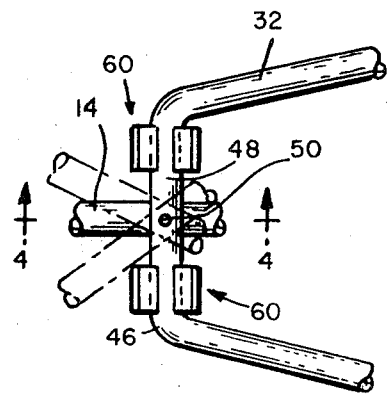
FIG. 3 is an enlarged plan view of the means for attaching the trailer to the bicycle frame.
Figure 4:
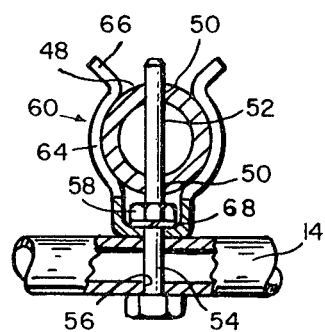
FIG. 4 is a section taken on the line 4—4 of FIG. 3.
Figure 2:
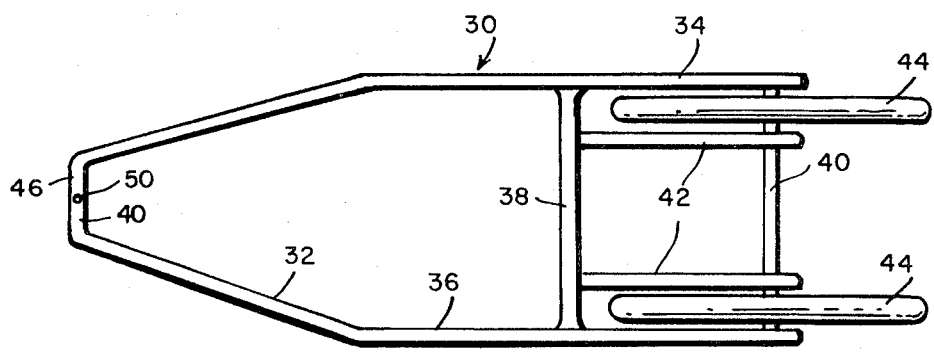
FIG. 2 is a plan view of the trailer frame with the skirt, seat and receptacle omitted.

The upper frame member 32, as shown in FIG. 3, has at its forward end a loop 46 which is adapted to be placed over the seat 18 of the bicycle, as shown in FIG. 1, ahead of the seat post 16 and under the seat and is provided with a straight portion 48 containing centrally thereof vertically disposed holes 50. A pin 52 comprising the shank of a bolt 54 is inserted through vertically disposed holes 56 in the top bar 14 of the bicycle frame and secured in this position by means of a nut 58 screwed onto it against the frame and this pin provides a pivot upon which the loop is impaled by engaging the holes 50 with the pin 52. As thus pivotally mounted the tandem trailer and bicycle are free to move angularly with respect to each other without interference.

The clearance between the trailer and the bicycle which permits unimpeded angular movement of one with respect to the other is also insured by the vertical frame members which join the upper and lower frame members in vertically spaced parallel relation so that when the upper frame member is engaged about the seat post it is situated well above the back wheel. The stepped disposition of the lower frame member on which the seat is mounted lowers the center of gravity and provides for greater stability.

The loop is detachably retained on the pin 52 by spring clamp means 60 comprising spaced clamp fingers having oppositely bowed portions 64—64 between which the portion 48 of the loop is adapted to be pressed and held. Divergent lips 66—66 facilitate depressing the loop between the fingers onto the pin 52. A single spring clamp may be used; however, preferably two such clamps are used attached to the opposite ends of a bar 68 pivotally mounted on the pin 52 and secured in place by the nut 58.

The aforesaid construction provides for easily and quickly attaching and detaching the trailer and the important advantage that even though the loop were to become detached, as, for example, the pin becoming loose and dropping out, the trailer cannot possibly become detached from the bicycle frame itself without the rider dismounting.

A seat 70 of conventional kind is mounted on the lower frame forwardly of the wheel and a receptacle 72 may be mounted rearwardly of the seat above the wheel axle. A skirt 74 comprised of sheet metal or similar material is mounted on the frame and commences on the lower horizontal frame below the seat, extends forwardly and upwardly along the vertical frame, and then forwardly along the horizontal upper frame and provides a deflector from debris thrown up by the back wheel of the bicycle and a wind breaker. The lower part of the skirt provides a foot support for the occupant of the seat.

A stand 76 comprising spaced parallel legs 78—78 is pivotally mounted at 80 on the lower frame member and when disposed in a substantially vertical position, as shown in FIG. 1, will support the trailer in substantially the same position that it would occupy as when attached to the bicycle. The stand may be left in this position when using the trailer or may be rotated rearwardly to a substantially horizontal position in parallelism with the frame and latched in that position by suitable clips 80.

It should be understood that the present disclosure is for the purpose of illustration only and that this invention includes all modifications and equivalents falling within the scope of the appended claims.

I claim:

1. The combination with a bicycle, of a tandem trailer comprising a chassis embodying vertically spaced, substantially parallel frame members joined by a vertical frame member, a pair of wheels journaled at the distal end of the lower horizontal frame member, a loop at the distal end of the higher horizontal frame member adapted to be placed over the seat of the bicycle about the seat supporting post, said wheels being adapted to support the trailer when the loop is disposed about the seat supporting post with the upper frame member in a substantially horizontal position clearing the top of the rear wheel of the bicycle so that the rear wheel of the bicycle and trailer can be disposed at angles to each other without binding against each other, and means for releasably pivotally connecting the loop to the top bar of the bicycle frame, comprising a pin projecting upwardly from the top bar forwardly of said seat post but beneath the seat, said loop containing a vertically disposed, diametrical hole for pivotally receiving the pin, and spring clamp means adapted to embrace and hold the loop on the pin when the loop is mounted thereon.

2. The combination of claim 1, wherein a seat is mounted on the lower horizontal frame member intermediate the vertical frame member and the wheels.

3. The combination of claim 2, wherein a skirt is secured to the frame members, said skirt commencing on the lower horizontal frame member beneath the seat, extending forwardly and upwardly of the vertical frame member and forwardly onto the upper frame member, said skirt constituting a deflector and the portion of the skirt on the lower horizontal frame member constituting a foot rest.

4. The combination of claim 2, wherein a receptacle is mounted on the lower horizontal frame member behind the seat.

5. The combination of claim 1, wherein a stand is pivotally mounted on the lower horizontal member forwardly of the wheels, said stand being rotatable to a position substantially perpendicular to the frame to hold the latter in a substantially horizontal position when detached from the bicycle.

6. The combination of claim 5, wherein the stand is adapted to be folded rearwardly into alignment with the lower horizontal frame member.

7. The combination of claim 1, wherein the pin comprises a shank of a bolt inserted through the top bar from the lower side and retained by nuts screwed onto it against the top side.

8. The combination of claim 1, wherein the spring clamp means comprises a bar pivotally mounted on the pin in transverse relation to the bar and opposed upstanding spring-biased fingers secured to the opposite ends of the bar, said spring-fingers being oppositely bowed to receive between them portions of the loop at each side of the pin.

9. The combination with a bicycle, of a tandem trailer comprising a chassis embodying a stepped frame having upper and lower, substantially horizontal portions, a pair of wheels journaled at the distal end of the lower portion, a loop at the distal end of the upper portion adapted to be placed over the seat of a bicycle about the seat supporting post, said upper horizontal portion being so vertically disposed that the wheels at the distal end of the lower portion support the trailer when the loop is disposed about the seat supporting post with the upper horizontal portion above the top of the rear wheels, and so that the lower horizontal portion can be turned at any angle to the bicycle without engaging the wheel, and means for releasably pivotally connecting the loop to the top bar of the bicycle frame comprising a pin projecting upwardly from the top bar forwardly of said seat post but beneath the seat, said loop containing a vertically disposed, diametrical hole for pivotally receiving the pin, and spring clamp means adapted to embrace and hold the loop on the pin when the loop is impaled thereon.

* * * * *